United States Patent [19]

Kuroda

[11] Patent Number: 5,196,855
[45] Date of Patent: Mar. 23, 1993

[54] SECONDARY SURVEILLANCE RADAR SYSTEM

[75] Inventor: Yuichi Kuroda, Yokohama, Japan

[73] Assignee: Kabushiki Kaisha Toshiba, Kawasaki, Japan

[21] Appl. No.: 879,918

[22] Filed: May 8, 1992

[30] Foreign Application Priority Data

May 9, 1991 [JP] Japan ................... 3-104283

[51] Int. Cl.$^5$ .................. G01S 13/76; G01S 13/87
[52] U.S. Cl. ........................... 342/37; 342/46; 342/32
[58] Field of Search .............. 342/37, 32, 38, 46

[56] References Cited

U.S. PATENT DOCUMENTS

| | | | |
|---|---|---|---|
| 3,875,570 | 4/1975 | Litchford | 342/32 |
| 4,688,046 | 8/1987 | Schwab | 342/456 |
| 4,719,465 | 1/1988 | Kuroda | 342/151 |
| 4,843,397 | 6/1989 | Galati et al. | 342/59 |
| 4,910,526 | 3/1990 | Donnangelo et al. | 342/455 |
| 4,978,945 | 12/1990 | Funatsu | 342/29 X |
| 5,075,694 | 12/1991 | Donnangelo et al. | 342/455 |
| 5,077,673 | 12/1991 | Brodegard et al. | 342/32 X |
| 5,081,463 | 1/1992 | Hariu et al. | 342/372 |
| 5,089,822 | 2/1992 | Abaunza et al. | 342/30 |

Primary Examiner—John B. Sotomayor
Attorney, Agent, or Firm—Oblon, Spivak, McClelland, Maier & Neustadt

[57] ABSTRACT

A secondary surveillance radar system combines a mechanical scanning type of mode-S sensor using a mechanical rotation type of antenna and an electronic scanning type of mode-S sensor using an electronic scanning type of antenna. The mechanical scanning type of mode-S sensor performs at least mode-A/C general inquiry/response with aircraft targets and create a file of surveillance data obtained by the general inquiry/response. This allows circumvention of problems, which would be encountered in performing the same processing by using the electronic scanning system, such as the deterioration of accuracy of monopulse angular measurement, the increasing probability that unwanted responses will be received, etc., which are due to the elevation dependence of horizontal beamwidths. The electronic scanning type of mode-S sensor performs at least mode-S individual inquiry/response, reducing the time interval allotted for the general inquiry/response, thereby permitting an increase in data link communications capacity, and real-time communications.

5 Claims, 4 Drawing Sheets

SECONDARY SURVEILLANCE RADAR SYSTEM

BACKGROUND OF THE INVENTION

1. Field of the Invention

The present invention relates to a secondary surveillance radar system which has operating functions of the mode A/C and the mode S, and performs surveillance of aircraft and air-to-ground data link communications.

2. Description of the Related Art

In the field of the secondary surveillance radar (SSR), the mode S has been developed recently as a next-generation operating mode. The mode S provides a function of performing air-to-ground data communications in addition to a function of performing selective addressing of an aircraft for individual inquiry/response to the aircraft. Particularly, the SSR that has the mode-S function in addition to the conventional mode A/C function dedicated to surveillance is called a mode-S sensor.

A typical way of implementing the mode-S sensor is to, as with the conventional SSR dedicated to the mode A/C, form an antenna beam in a horizontal plane by using an antenna system mechanically rotating at constant speed, and to divide a time that the antenna beam illuminates an aircraft target (called a beam dwell time) into respective periods allotted for general inquiry/response in the mode A/C and the mode S and individual inquiry/response in the mode S.

The mechanical rotation type of mode-S sensor is excellent in surveillance capability because it permits an antenna beam to make circular scanning. However, it takes a relatively long time for an aircraft target to enter the illuminating range of the antenna beam because of constant-speed rotation, and thus data must be stored until communications have been made possible. For this reason, the limitations on data communications capacity and the time difference between the occurrence of a request for communications and the completion of the communications become great problems.

To solve the problems, an electronic scanning system has been devised. With this system, antenna arrays are arranged in the shape of a cylinder to form an electronic scanning antenna. The electronic scanning antenna permits a beam to be directed to a desired aircraft target at any point of time to thereby perform general, individual inquiry/response with the aircraft target. The system is discussed in detail in a research report on electronic scanning version of radar antennas, published by Japan Civil Aviation Promotion Foundation, March 1986.

It will be expected that the electronic scanning type of mode-S sensor offers significant improvements in the data communications capacity and the delay time characteristic. However, horizontal beamwidths are not uniform in angle of elevation because the antenna arrays are arranged in the shape of a cylinder. Thus, depending on angles of elevation, unwanted responses increase, and monopulse angular measurement characteristics that are requirements of the mode S may deteriorate.

Such problems could be eliminated by making the diameter of the cylindrical array large, say, more than ten and several meters, and using a large number of arrays to narrow the array spacing. Such is almost impossible to realize physically and economically.

SUMMARY OF THE INVENTION

Problems which arise with the conventional secondary surveillance radar based on mechanical rotation in implementing the mode S are limitations on data communications capacity and limitations on communication delay time, which result from constant-speed rotation of an antenna beam. With the conventional radar based on electronic scanning, on the other hand, horizontal beamwidths cannot inevitably be made uniform in angle of elevation because antenna arrays are arranged in the shape of a cylinder, resulting in an increase in unwanted responses and deterioration of monopulse angular measurement characteristics.

It is therefore an object of the present invention to provide a secondary surveillance radar sensor which realizes a mode S sensor that is equipped with a high-precision surveillance function and a high-speed, large-capacity air-to-ground data link communications function.

According to the present invention there is provided a secondary surveillance radar system comprising:

a mechanical scanning sensor using a mechanical rotation type of antenna to form a beam in a horizontal plane and rotate it at a constant speed and having a function of performing mode-A/C general inquiry/response with aircraft targets within the beam, and a function of preparing management data file for the aircraft targets on the basis of responses from the aircraft targets; and an electronic scanning sensor using an electronic scanning type of antenna for electronically causing a beam to scan in a horizontal plane, and having a function of designating the aircraft targets in sequence by referring to the management data file, a function of performing mode-S individual inquiry/response with each of the aircraft targets designated in sequence, and a function of performing data link communications with each of the targets.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Figure 1:
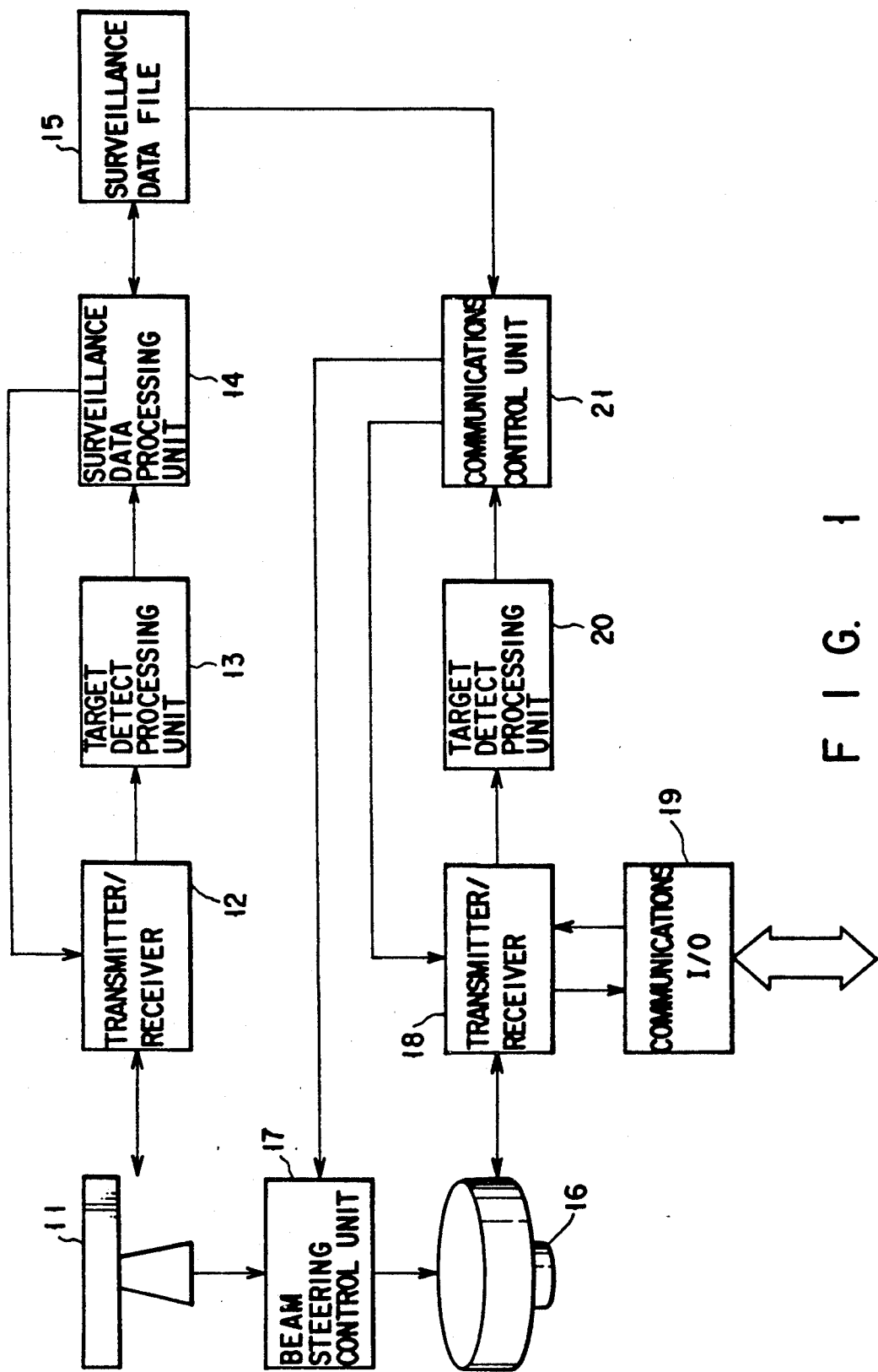
FIG. 1 illustrates an arrangement of a secondary surveillance radar system embodying the present invention.
Figure 2:
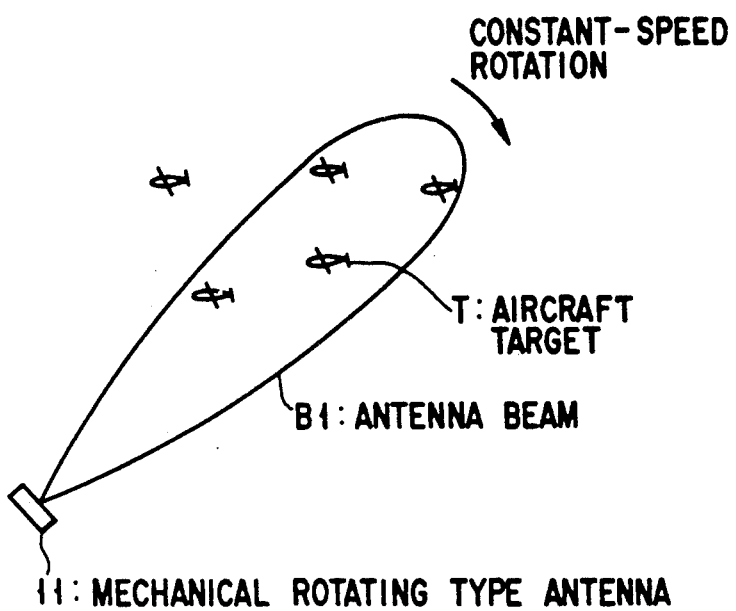
FIG. 2 is a diagram for use in explanation of the operation of a mechanical rotation type of antenna used in the embodiment of FIG. 1.

Referring now to FIG. 1, there is illustrated a mechanical rotation type of antenna 11 which is rotated mechanically at a constant speed. The antenna 11 forms an antenna beam B1 in a horizontal plane and rotates it at a constant speed. A transmitter/receiver 12 performs general inquiry/response operation and individual inquiry/response with a target T within the beam through the antenna 11. Response signals received are sequentially sent to a target detection processing unit 13. The target detection processing unit 13 detects the position of the aircraft target T in the area covered by the antenna beam B1 in accordance with the response signals, the result of the detection being fed into a surveillance data processing unit 15.

Figure 3:
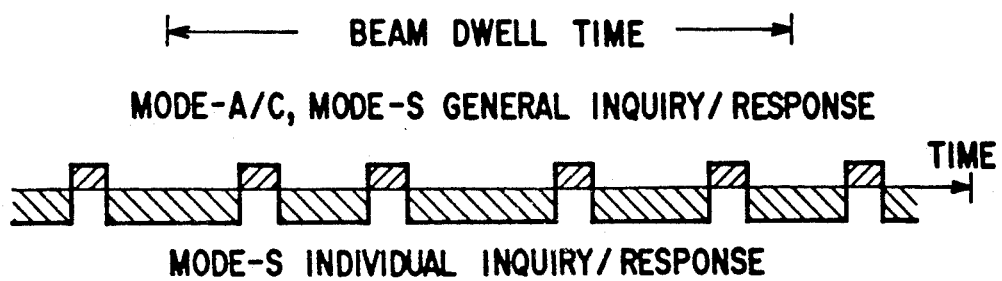
FIG. 3 is a diagram for use in explanation of the mode-S processing function of a mechanical scanning sensor used in the embodiment of FIG. 1.

The surveillance data processing unit 14 collects current positions of individual targets T on the basis of results of target detection and stores them in a surveillance data file 15. In addition, it obtains a beam dwell time for each target (a time that the antenna beam B1 illuminates each target T). The beam dwell time is then divided into mode-A/C and mode-S general inquiry/response periods and mode-S individual inquiry/response periods as shown in FIG. 3. The data processing unit 14 allows the transmitter/receiver 12 to be switched between the general and individual inquiry/response operations.

That is, the mechanical rotation type of antenna 11, the transmitter/receiver 12, the target detection processing unit 12, the surveillance data processing unit 14, and the surveillance data file 15 construct a mechanical rotation type of mode-S sensor (hereinafter referred to as a mechanical scanning sensor), which tracks each target T in the mode A/C and the mode S to update and maintain the surveillance data file 15.

Figure 4:
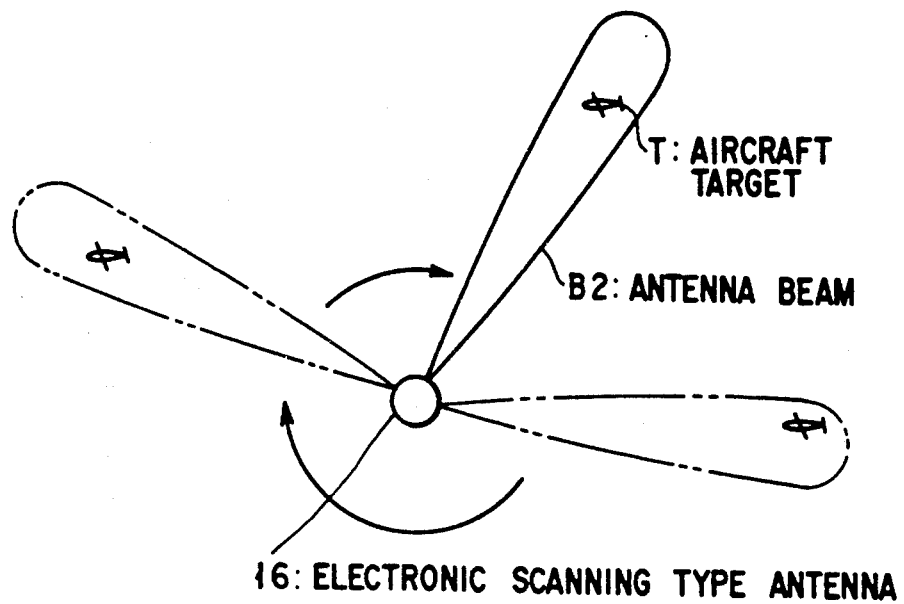
FIG. 4 is a diagram for use in explanation of the operation of an electronic scanning type of antenna used in the embodiment of FIG. 1.

On the other hand, 16 designates an electronic scanning type of antenna that is constructed by arranging antenna arrays in the shape of a cylinder. In a horizontal plane the antenna 16 can steer a beam B2 in any azimuth at any point of time as shown in FIG. 4. The steering control of the beam B2 is performed by a beam steering control unit 17.

The beam steering control unit 17 is also responsive to azimuth information about the beam B1 from the mechanical rotation type of antenna 11 to control the beam B2 in such a way that it is not directed in the same azimuth as the beam B1 simultaneously. This control is performed in order to prevent interference which may occur when inquiry/response frequencies of the antenna beams B1 and B2 are coincident with each other.

A transmitter/receiver 18 performs an individual mode-S inquiry/response operation with a specific target T within the beam B2 through the antenna 16. The transmitter/receiver is connected with external communications equipment (not shown) via a communication interface (I/O) 19, thereby establishing data communications link between the data communications equipment and the target T as necessary. Response signals received are sent to a target detection processing unit 20, which detects the position of the target T in accordance with the input response signals. The result of detection is sent to a communications control unit 21.

The communications control unit 21 first refers to the surveillance data file 15 to lay out a mode-S inquiry/response schedule, and then designates targets in sequence in accordance with this schedule. Next, the control unit 21 retrieves surveillance data on a designated target from the data file 15, obtains the current position of the designated target from the surveillance data, and prompts the beam steering control unit 17 to steer the beam B2 to the designated target. After making sure that the designated target has been detected, the communications control unit 21 causes the transmitter/receiver 18 to carry out an mode-S individual inquiry-response operation or data communications.

Besides the above functions, the communications control unit 21 has other functions required of the mode-sensor, such as system management, network management, etc.

That is, the electronic scanning type of antenna 16, the beam steering control unit 17, the transmitter/receiver 18, the communications interface 19, the target detection processing unit 20, and the communications control unit 21 construct an electronic scanning type of mode-S sensor (hereinafter referred to as an electronic scanning sensor), which implements mode-S individual inquiry/response operation, and data link communications between targets and external data communications equipment.

Figure 5A:
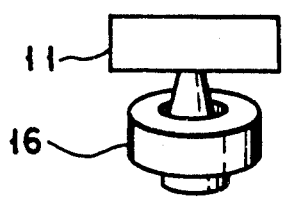
FIGS. 5A, 5B and 5C are diagrams for use in explanation of installation of a mechanical rotation type of antenna and an electronic scanning type of antenna used in the embodiment of FIG. 1.
Figure 5B:
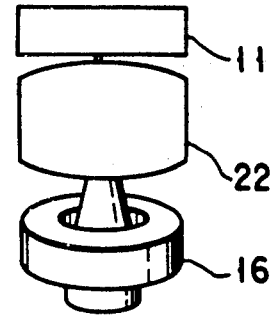
Figure 5C:
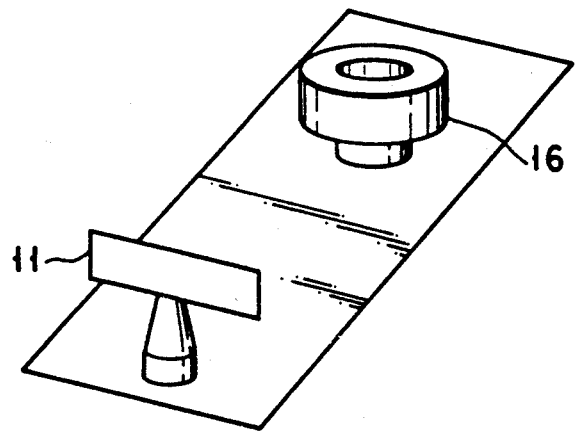

The mechanical rotation type antenna 11 and the electronic scanning type antenna 16 can be installed with one placed upon the other as shown in FIG. 5A. The antennas may also be combined with a primary radar antenna 22 so that they are placed upon each other as shown in FIG. 5B. In the case where the mechanical rotation type antenna 11 has already been installed, the electronic scanning type antenna 16 may be installed apart from the mechanical scanning type antenna as shown in FIG. 5C.

Hereinafter, the operation of the secondary surveillance radar system constructed as described above will be described.

As with the conventional sensor, the mechanical scanning sensor rotates an antenna beam B1 at a constant speed, detects the position of an aircraft target T, and files the target position detected as surveillance data. Further, the sensor divides a beam dwell time into periods allotted for mode-A/C and mode-S general inquiry/response operation and mode-S individual inquiry/response operation.

With the mechanical scanning sensor, as described above, a certain time will elapses before an aircraft target T enters the illumination range of the antenna beam B1 because of constant-speed rotation of the beam. The individual inquiry/response operation and data link communications cannot be performed at any point of time.

Accordingly, the present invention adds the electronic scanning sensor that causes the antenna beam B2 formed by the electronic scanning type antenna 16 to be directed at any point of time in azimuth to the aircraft target T to be communicated with while referring to the surveillance data file 15 prepared by the mechanical scanning sensor. Thereby, the mode-S individual inquiry/response operation and data link communications are allowed between the target T and the system at any point of time.

Figure 6:
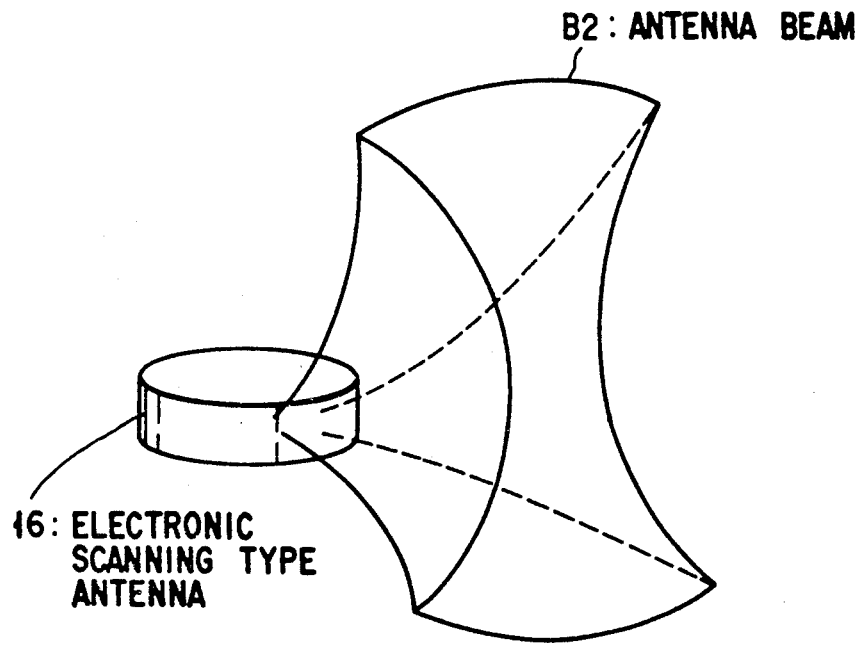
FIG. 6 illustrates beam characteristics of the electronic scanning type of antenna used in the embodiment of FIG. 1.

With the electronic scanning type antenna 16, elevation angles of the horizontal beamwidths will vary as shown in FIG. 6 because antenna arrays are arranged in the shape of a cylinder as described previously. However, the elevation dependence of the beamwidths is tolerated to some extent, and the requirements for side lobe characteristics is alleviated because the results of individual inquiry/response performed by the electronic scanning sensor are not used to update and maintain the surveillance data file.

In addition, the utilization of high-precision surveillance data, which is obtained by the mechanical scanning sensor, will permit accurate electronic scanning and beam steering control to be implemented by the electronic scanning sensor. This provides a significant improvement in the degree of freedom of design of the electronic scanning type antenna 16, permitting a small, inexpensive antenna to be built.

The secondary surveillance radar of the present invention, which performs the mode-A/C and mode-S general inquiry/response, the mode-S individual inquiry/response, and the surveillance data processing by using the mechanical scanning sensor, can circumvent problems that would be encountered in performing the same processing by using the electronic scanning sensor, that is, the deterioration of the monopulse angle measurement resulting from the elevation dependence of horizontal beamwidths, the increasing probability that unwanted responses will be received, etc.

Since the functions of the electronic scanning sensor are restricted to the mode-S individual inquiry/response and data link communications, the need of time intervals allotted for general inquiry/response is eliminated, thereby increasing the data link communications capacity and permitting real-time communications.

The present invention is not restricted to the embodiment described above.

For example, in the above embodiment, each of the mechanical scanning sensor and the electronic scanning sensor is equipped with a transmitter/receiver and a target detection processing unit. The transmitter/receivers of the two sensors may be integrated with each other physically or substantially, and the target detection processing units thereof may also be integrated with each other physically or substantially. The surveillance data processing unit and the communication control unit, which have a lot in common, may also be integrated with each other.

Moreover, the surveillance data processing unit 14 may include functions required of a mode-S sensor, such as data link communications processing function, etc., in addition to the surveillance data processing function.

Furthermore, the electronic scanning sensor may be equipped with the mode-S general inquiry/response function, and the arrangement and the processing function of the mechanical scanning sensor may be restricted to the mode-A/C general inquiry/response. In this case, however, it is required for the electronic scanning sensor to previously acquire information (at present, 24-bit address information) about mode-S carrying aircrafts (aircraft targets) which is needed to perform the mode-S general inquiry/response.

In addition, the mechanical scanning sensor may have its processing function restricted to the mode-A/C and mode-S general inquiry/response with all the individual inquiry/response functions left to the electronic scanning sensor. In this case, the mechanical scanning sensor can acquire information about mode-S carrying aircrafts by the mode-S general inquiry/response. However, it is required that an mode-S carrying aircraft, once captured, should continually respond to the mode-S general inquiry instead being locked out of the general inquiry.

Although the preferred embodiment of the present invention has been disclosed and described, it is apparent that other embodiments and modifications are possible.

As described above, according to the present invention, there is provided a secondary surveillance radar adapted for the mode S which permits a high-speed, large-capacity air-to-ground data link communications function to be implemented while performing a high-precision surveillance function.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A secondary surveillance radar system comprising:
   a mechanical scanning sensor using a mechanical rotation type of antenna to form a beam in a horizontal plane and rotate it at a constant speed and having a function of performing mode-A/C general inquiry/response with aircraft targets within the beam, and a function of preparing management data file for the aircraft targets on the basis of responses from the aircraft targets; and
   an electronic scanning sensor using an electronic scanning type of antenna for electronically causing a beam to scan in a horizontal plane, and having a function of designating the aircraft targets in sequence by referring to the management data file, a function of performing mode-S individual inquiry/response with each of the aircraft targets designated in sequence, and a function of performing data link communications with each of the targets.

2. The secondary surveillance radar system according to claim 1, in which the electronic scanning sensor is further equipped with a function of performing mode-A/C individual inquiry/response with the aircraft targets.

3. The secondary surveillance radar system according to claim 1, in which the mechanical scanning sensor is further equipped with a function of performing mode-S general inquiry/response with the aircraft targets, and the electronic scanning sensor is further equipped with a function of performing mode-A/C individual inquiry/response with the aircraft targets.

4. The secondary surveillance radar system according to claim 1, in which the mechanical scanning sensor is further equipped with a function of performing mode-S general inquiry/response and a function of performing mode-S individual inquiry/response with the aircraft targets.

5. The secondary surveillance radar system according to claim 1, in which the mechanical rotation type of antenna and the electronic scanning type of antenna are installed with one placed upon the other.

* * * * *